United States Patent
Takashiba et al.

[11] Patent Number: 5,177,763
[45] Date of Patent: Jan. 5, 1993

[54] FURNACE BOTTOM STRUCTURE OF DIRECT CURRENT ELECTRIC FURNACE

[75] Inventors: Nobuyoshi Takashiba; Hisakazu Mizota; Kiyoshi Takahashi, all of Okayama, Japan

[73] Assignee: Kawasaki Steel Corporation, Kobe, Japan

[21] Appl. No.: 674,706

[22] Filed: Mar. 25, 1991

[30] Foreign Application Priority Data

Mar. 28, 1990 [JP] Japan .................. 2-76993
Oct. 15, 1990 [JP] Japan .................. 2-106907[U]

[51] Int. Cl.⁵ .................................................. F27D 1/00
[52] U.S. Cl. .................................. 373/72; 373/22; 373/62; 373/71; 75/10.4; 75/10.42; 75/552; 266/35; 266/158; 266/222
[58] Field of Search ........................ 373/72, 108, 22, 24, 373/93, 71, 32, 30, 113, 120, 84, 85, 60, 68, 19, 42, 76; 266/35, 158, 222; 75/10.42, 10.4, 552, 581

[56] References Cited

U.S. PATENT DOCUMENTS

| | | | |
|---|---|---|---|
| 3,708,599 | 1/1973 | Krause | 373/60 |
| 3,902,889 | 9/1975 | Malin | 373/71 |
| 3,918,692 | 11/1975 | Oberg | 266/35 |
| 4,414,673 | 11/1983 | Lugscheider et al. | 373/22 |
| 4,483,709 | 11/1984 | Schempp et al. | 373/68 |
| 4,617,671 | 10/1986 | Lugscheider et al. | 373/22 |
| 4,726,033 | 2/1988 | Lazcano-Navarro et al. | 373/71 |
| 4,754,464 | 6/1988 | Feuerstake | 373/72 |
| 4,796,277 | 1/1989 | Maddever et al. | 373/72 |
| 4,982,411 | 1/1991 | Michelet et al. | 373/72 |

FOREIGN PATENT DOCUMENTS

57-60011 4/1982 Japan .

Primary Examiner—Bruce A. Reynolds
Assistant Examiner—Tu Hoang
Attorney, Agent, or Firm—Dvorak and Traub

[57] ABSTRACT

A furnace bottom structure of a direct current electric furnace has at least one furnace bottom electrode and at least one gas injection tuyere provided in the furnace bottom refractory of the direct current electric furnace. Preferably, the furnace bottom electrodes and the gas injection tuyere are embedded in a substantially cylindrical refractory body with downwardly diverging tapered upper portion. The refractory body, the furnace bottom electrodes and the gas injection tuyere form an integral furnace bottom block which is detachably attached to the bottom of the electric furnace so as to close a bottom opening of the furnace.

3 Claims, 6 Drawing Sheets

FURNACE BOTTOM STRUCTURE OF DIRECT CURRENT ELECTRIC FURNACE

BACKGROUND OF THE INVENTION

1. Field of the Invention

The present invention relates to a furnace bottom structure of a direct current electric furnace which melts and refines metals by arcs produced by a direct current.

2. Description of the Related Art

Conventionally, steel making arc furnaces are of alternating current type. In recent years, however, thyristors and diodes serving as large-capacity AC/DC converters are available and, for this reason, direct current electric furnaces are attracting attention.

In producing a steel by a direct current electric furnace, scraps are loaded in the furnace and then electric power is supplied to the electrodes of the furnace thereby melting the scrap and refining the melt. In order to promote melting and refining, oxygen gas is supplied into the furnace through a lance which is inserted in a charging hole. Feeding of a lance into an electric furnace, however, requires a plurality of workers who are obliged to sustain heavy and laborious work at high air temperature. This is quite undesirable from the view point of safety.

Apparatus has been proposed which can feed a lance by means of a truck. Such an apparatus requires a large installation space which restricts the working space in front of the furnace.

Moreover, oxygen blowing through a lance alone cannot provide sufficient melting effect and does not provide uniform composition of the melt due to insufficient stirring effect.

As an improvement in the above-described art which makes use of a lance, an electric furnace has been proposed in Japanese Patent Laid-Open No. 57-60011 in which a plurality of tuyeres for blowing an oxidizing gas or an inert gas are disposed under the upper electlode on the furnace bottom along a circle concentric to the electrode. This improved electric furnace, however, suffers from a problem in that, during the supply of electric power to the upper electrode, electric current flows through the furnace shell to generate sparks between MgO-C type tuyere bricks and the tuyere so that the tuyere can become molten allowing leakage of gas. Consequently, the operation of the furnace becomes stable and dangerous. In order to overcome this problem, an electric furnace has been proposed in Japanese Patent Laid-Open No. 57-188980 in which the surface of an outer tube of a double tuyere is coated with an electrically insulating material while the double tuyere itself is grounded, thereby preventing generation of arc. This art, however, is intended to prevent generation of an arc only at the gap between the furnace bottom gas blowing tuyere and the tuyere bricks around the tuyere.

All of this known arts is intended for overcoming problems encountered with the alternating current electric furnace, and no proposal has been made for elimination of the same problem in direct current furnaces.

SUMMARY OF THE INVENTION

Accordingly, an object of the present invention is to provide a bottom block structure of a direct current electric furnace which enables oxygen injection to be done safely and securely at a low cost, thus ensuring a quick melting of scrap charged in the furnace and which can promote refining of the molten metal.

To this end, according to the present invention, there is provided a bottom block structure of a direct current electric furnace in which a furnace bottom electrode and a gas injection tuyere are provided in the furnace bottom refractory of the furnace.

The invention also provides a bottom block structure of a direct current electric furnace, comprising a furnace bottom block including a substantially cylindrical refractory body formed on a base plate and having a downwardly diverging tapered upper portion, and a furnace bottom electrode and a gas injection tuyere which are embedded in the refractory body, the furnace bottom block being detachably mounted on the bottom opening of the furnace.

Thus, in the operation of the direct current electric furnace of the invention, oxygen gas or an inert gas is injected into the furnace through the gas injection tuyere provided on the furnace bottom, thus promoting melting of the scrap by an arc while accelerating refining reaction of the molten steel.

In addition, detachable furnace bottom block allows easy renewal of the gas injection tuyere and furnace bottom electrode.

Other objects, features and advantages of the present invention will become clear from the following description of the embodiments taken in conjunction with the accompanying drawings.

DESCRIPTION OF THE PREFERRED EMBODIMENTS

Preferred embodiments of the present, invention will be described with reference to the accompanying drawings.

Figure 1:
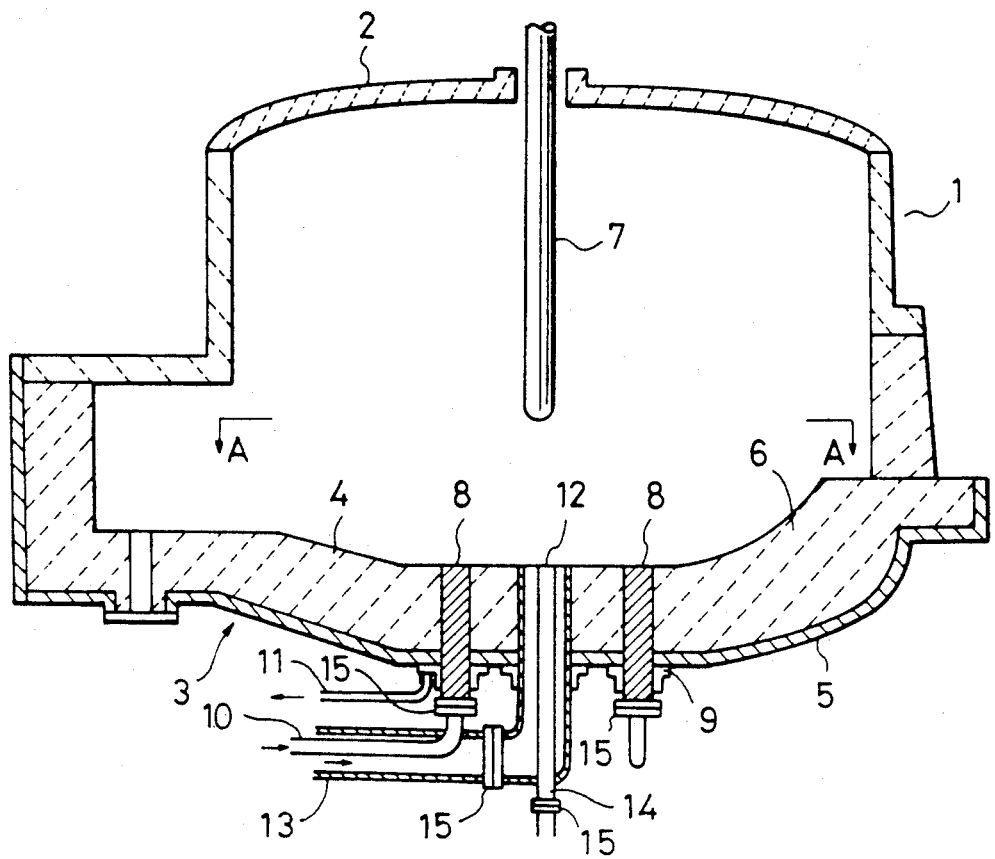
FIG. 1 is a sectional side elevational view of an embodiment of the present invention.
Figure 2:
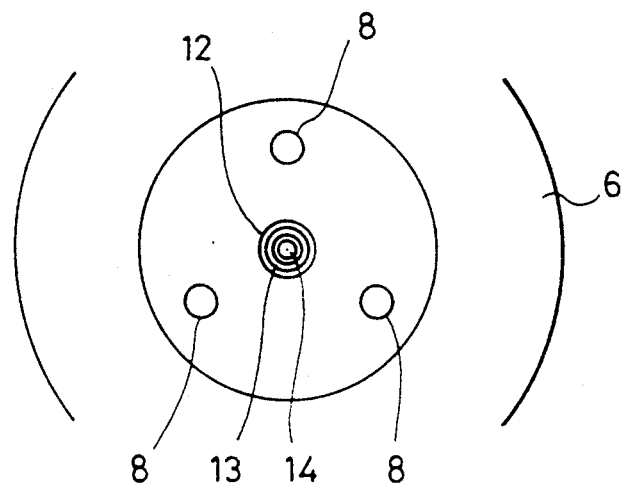
FIG. 2 is a plan view as viewed in the direction of arrow line A—A in FIG. 1.

FIGS. 1 and 2 show an embodiment of the direct current electric furnace of the present invention in which steel scraps are melted and refined under the supply of a direct current. The direct current electric furnace shown in FIGS. 1 and 2 have a furnace body 1, a furnace roof 2, and a furnace bottom portion 3 having a furnace bed refractory 6 sandwiched between the furnace bottom 4 and a bottom plate 5. Numeral 7 denotes an upper electrode made of graphite, while 8 denotes cylindrical steel furnace bottom electrodes which are embedded in the refractory 6 so as to be exposed in the upper surface of the refractory 6. In the illustrated embodiment, three furnace bottom electrodes 8 are disposed on a circle. Each electrode 8 has a diameter of 100 to 250 mm. A water cooling box 9 is provided to surround the portion of each furnace bottom electrode 8 exposed to the outside of the furnace. Cooling water is supplied into the water cooling box through a water supply pipe 10 and is discharged through a drainage pipe 11 so as to cool the furnace bottom electrode 8. thus preventing melt-down of the electrode 8. The water supply pipe 10 serves also as a conductor for applying a voltage to the furnace bottom electrode 8. A single double-walled tuyere 12, composed of an outer tube 13 and an inner tube 14, is embedded in the furnace bottom refractory 6 so as to project upright into the furnace from the exterior of the same and to open in the upper surface of the furnace bottom refractory 6 substantially at the surface, on which the furnace bottom electrodes 8 are disposed. Preferably. MgO-C type sleeve bricks are disposed around the furnace bottom electrodes 8 and the double-walled tuyere 12 so as to extend the life of the furnace bottom. The double-walled structure of the tuyere is intended for a cooling purpose. When an inert gas such as Ar gas is injected, there is no need for the cooling and, hence, a single-walled tuyere may be used.

The operation of this embodiment is as follows. After charging the furnace body 1 of the direct current electric furnace with scraps, an upper electrode 7 made of graphite is inserted into the furnace through the furnace roof 2 and electric current power is applied through the upper electrode 7 and the furnace bottom electrodes 8 so that arcs are generated between the electrodes to produce heat which melts the scraps and refines the molten steel. Thus, the operation of the electric furnace itself is the same as that of known electric furnaces.

During the melting and refining, oxygen gas is injected into the furnace body 1 through the inner tube 14. Propane gas is supplied through the gap between the outer tube 13 and the inner tube 14 of the double-walled tuyere 12, so as to cool the latter. Rates of supply of the oxygen gas and the propane gas are increased in the initial stage of the melting after the charging of the material or when the quantity of the scrap is large, for the purpose of enhancing the stirring effect. As a result, the velocity of upward flow of the steel melt is increased to enhance the exchange of heat with the surface of the steel melt, thus promoting melting of the scraps.

Conversely, when the quantity of the scraps is small or when the melting has proceeded to some extent, the gas flow rates are decreased to optimize the operating condition. It is possible to efficiently operate the furnace by adjusting the gas supply rates in accordance with the quantity of the scrap in the initial stage of operation, while, in the refining stage, suitably controlling the flow rates of the propane gas and the oxygen gas in accordance with the contents of components such as C and temperature.

Figure 3:
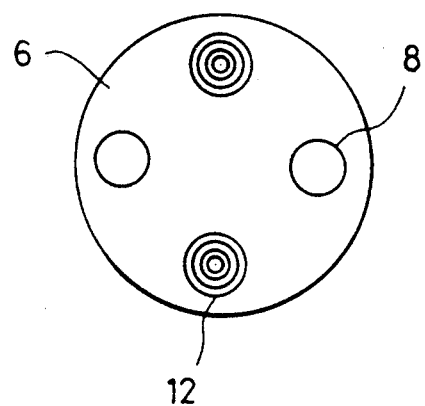
FIGS. 3 and 4 are plan views of critical portions of modifications of the arrangement shown in FIG. 2.
Figure 4:
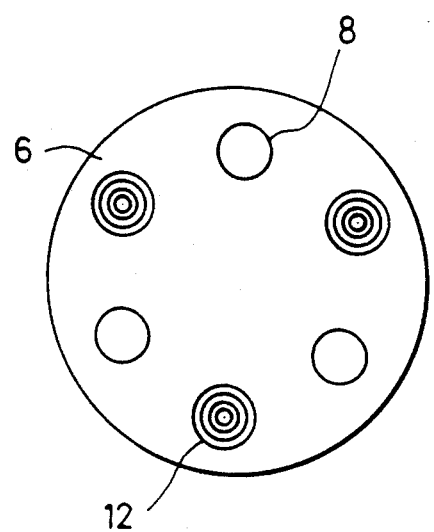

The direct current electric furnace of the present invention has at least two furnace bottom electrodes and at least one gas injection tuyere which may be double-walled or single-walled. Thus, the combination of the furnace bottom electrodes and the tuyere shown in FIG. 2 is only illustrative and various other forms of combination are adoptable. For instance, in an arrangement shown in FIG. 3, a pair of bottom electrodes 8 and a pair of tuyeres 12 are disposed alternatingly such that each tuyere 12 is disposed at the same distance from both furnace bottom electrodes 8. In the arrangement shown in FIG. 4, three furnace bottom electrodes 3 and three tuyeres 12 are arranged alternatingly and evenly spaced. It is thus possible to adopt an optimum combination of the tuyere and furnace bottom electrode depending on conditions such as the capacity of the direct current electric furnace.

A description will now be given of the reason why the numbers of the furnace bottom electrode and the gas injecting tuyere 12 are limited.

In direct current electric furnace of a large scale, if only one furnace bottom electrode is used, it is impossible to supply the required large power and, in addition, the directivity of the arc is rendered unstable due to the supply of large electric current In contrast, when a plurality of furnace bottom electrodes are used, the current is shared by these electrodes.

The gas injection tuyere is essential for injecting oxygen and Ar gas for the purpose of promoting melting and refining of steel. The number of the gas injection tuyeres may be determined in accordance with the number of the furnace bottom electrodes. It is, however, preferred that each of said furnace bottom electrode is symmetrically disposed in the furnace bottom and each gas injection tuyere is disposed between adjacent furnace bottom electrodes, at an equal distance from these furnace bottom electrodes.

By using a plurality of electrodes in combination with gas injection tuyeres, it is possible to melt the scraps in a shorter time and to enhance the agitation effect during refining, thus shortening the operating time. Furthermore, automatic injection of the gas is made possible.

Figure 5:
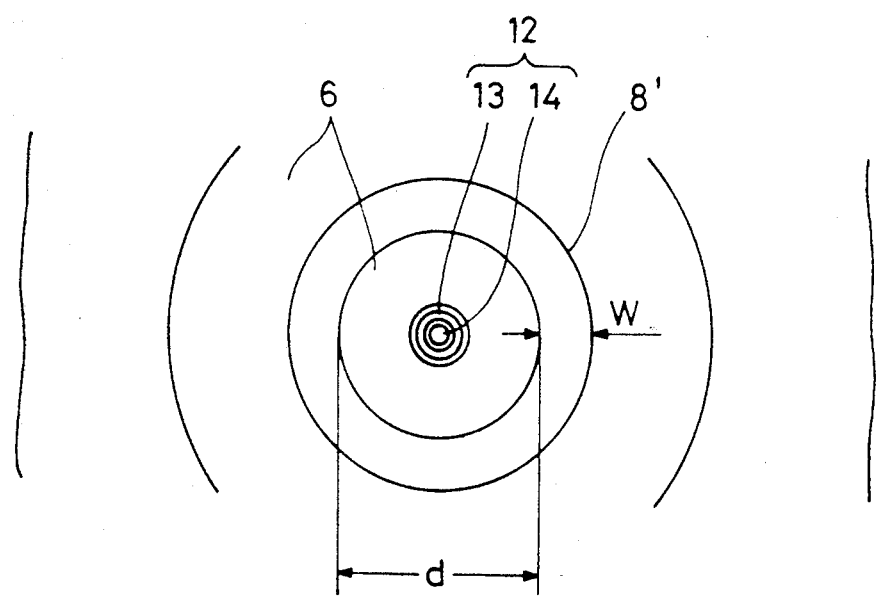
FIG. 5 is a plan view of another embodiment of the present invention.

FIG. 5 shows a different embodiment of the present invention. Numeral 8' designates a hollow cylindrical furnace bottom electrode which extends upright from the exterior to the interior of the furnace so as to be exposed in the upper surface of the refractory 6. Preferably, this furnace bottom electrode 8' has a wall thickness w ranging between 100 and 250 mm and inside diameter d ranging between and 1200 mm.

The interior of the hollow cylindrical furnace bottom electrode 8' is charged with the refractory 6 in the center of which is embedded a single double-walled tuyere 12 composed of an outer tube 13 and an inner tube 14. The double-walled tuyere 12 extends from the exterior to the interior of the furnace so as to be exposed in the upper surface of the refractory 6. The embodiment shown in FIG. 5 is regarded as being a modification of the embodiment shown in FIGS. 1 and 2 obtained by substituting a single hollow cylindrical furnace bottom electrode 8' for the three cylindrical furnace bottom electrodes 8' shown in FIGS. 1 and 2. Thus, the effect produced by the combination of the single double-walled tuyere 12 and the hollow cylindrical furnace bottom electrode 8' is materially the same as that produced by the combination of the single double-walled tuyere and three furnace bottom electrodes used in the embodiment shown in FIGS. 1 and 2.

The use of hollow cylindrical furnace bottom electrode in combination with the single central gas injection tuyere offers the following advantage. Firstly, it is to be pointed out that the structure for mounting the electrode and the nozzle becomes compact. In addition, the gas injected from the double-walled gas injection tuyere is expected to produce a certain cooling effect on the electrode. It is also expected that the electrode is protected by a mushroom generated in the nozzle portion.

Figure 6:
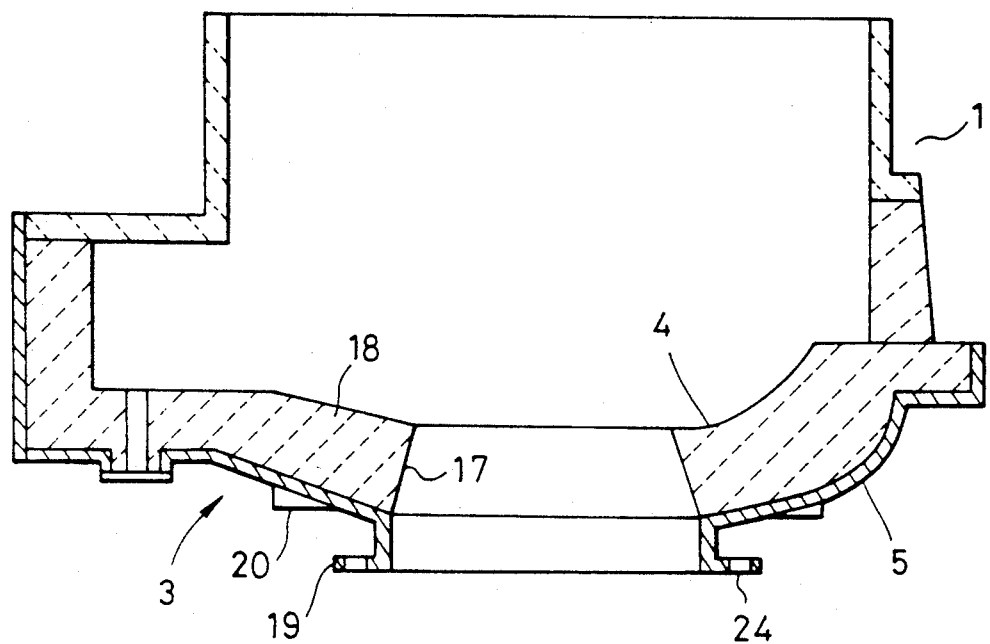
FIGS. 6 and 7 are sectional side elevational views of a direct current electric furnace of the invention after separation of of a furnace bottom block detached from a furnace.
Figure 7:
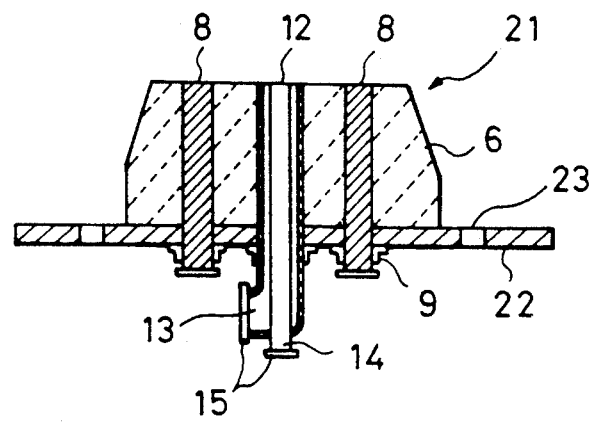

A description will now be given of a detachable furnace bottom block, with reference to FIGS. 6 and 7. The furnace bottom block 21 has a substantially cylindrical refractory 6 carried by a base plate 22 and having a downwardly diverging tapered portion. In the refractory 6 are embedded three furnace bottom electrodes 8 and a single double-walled tuyere 12. Thus, the refractory 6, furnace bottom electrodes 8 and the double-walled tuyere 12 form the furnace bottom block 21 which is an integral block 21. The block 21 is fitted in a furnace bottom opening 17 provided in the furnace bottom portion 3 of the furnace body 1 and is detachably secured to the furnace bottom portion 3 by means of, for example, bolts.

The furnace bottom portion 3 which is defined by the furnace bottom 4 of the furnace body 1, bottom plate 5 and the furnace bottom opening 17 is heat-insulated by means of refractory bricks 18.

Figure 8:
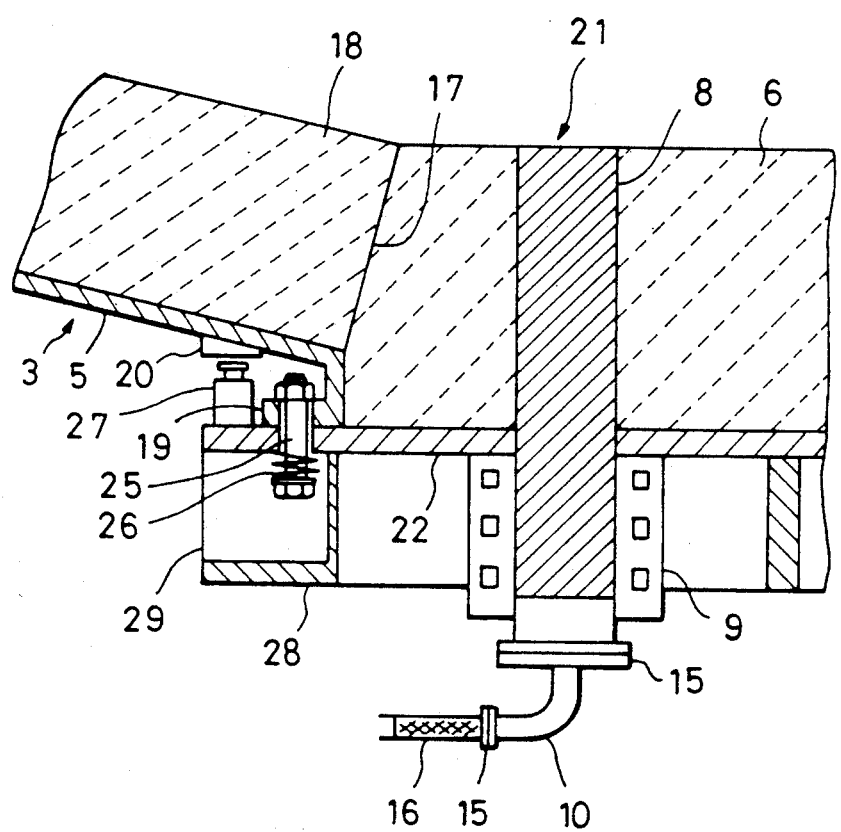
FIG. 8 is a sectional view showing the detail of the furnace bottom block.

A description will now be given of the construction for mounting and demounting the furnace bottom block 21 in and from the furnace bottom opening 17, with specific reference to FIG. 8.

The bottom plate 5 is extended to form a reinforcement flange 19 around the lower end of the furnace bottom opening 17. At the same time, seats 20 are provided on the bottom plate 5. The base plate 22 of the furnace bottom block 21 is adapted to be fastened to the above-mentioned reinforcement flange 19 by means of bolts, 25 which are received in bolt holes 23, 24. Preferably, the base plate 22, which supports the furnace bottom block 21, is reinforced with a base-plate reinforcement flange 28 and ribs 29. Preferably, the bolts 25 are tightened through springs 26 acting between the heads of these bolts and the base plate 22 so that tightening force is stably exerted despite any thermal distortion around each bolt 25.

The demounting of the furnace bottom block is conducted in the following manner. In order to separate the furnace bottom block 21 from the furnace bottom opening 17, separation jacks 27 are placed to act between the base plate 22 and the seats 20 provided on the bottom plate 5. Preferably, portable small jacks easy to handle are used as the separation jacks 27. A water supply pipe 10 for cooling the furnace bottom electrodes 8 is preferably connected by means of flanges 15 and adjacent portions of the flanges 15 consist of flexible electric conductors 16.

Figure 9:
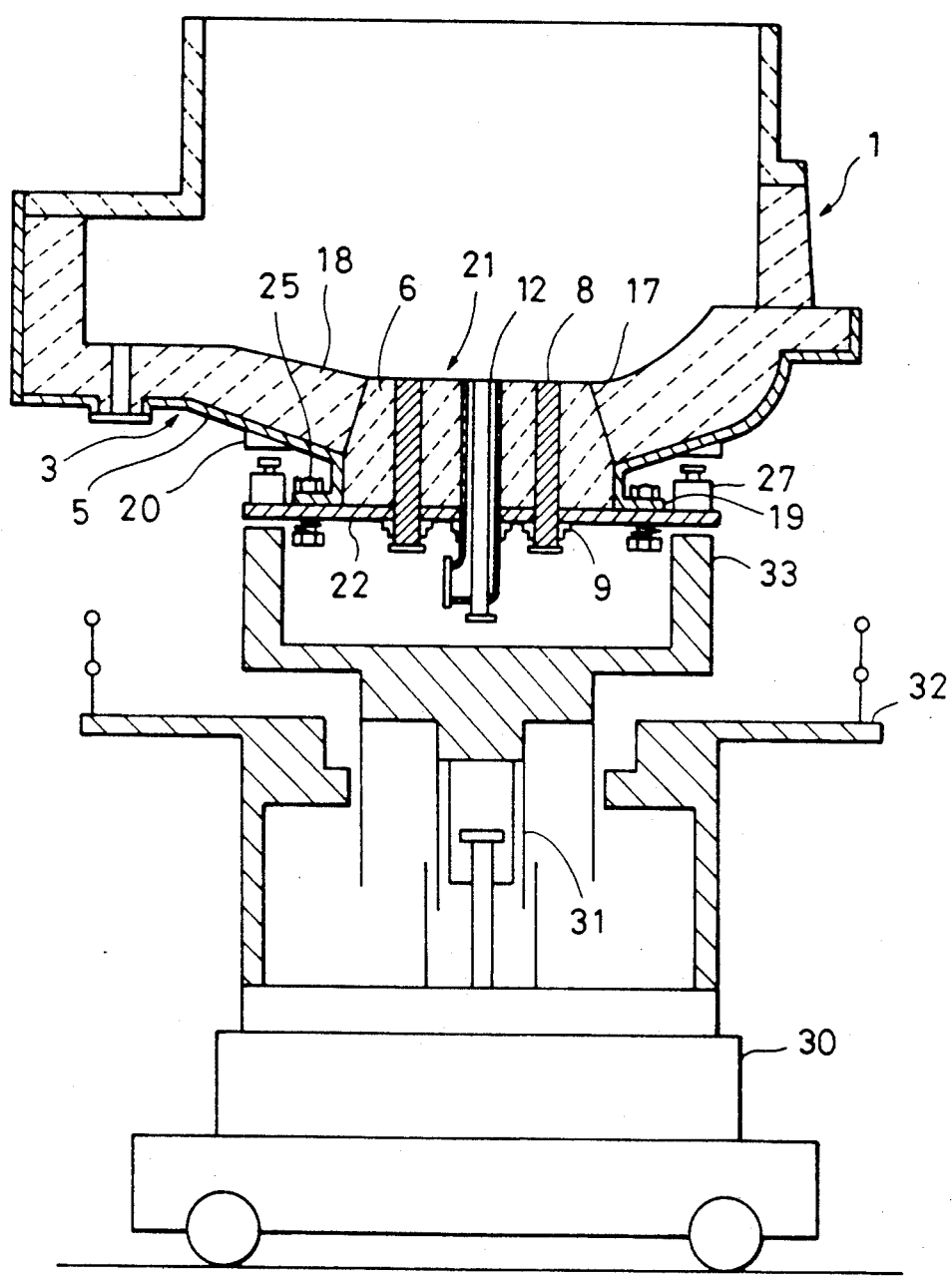
FIG. 9 is a schematic sectional view of the direct current electric furnace of the present invention illustrative of the manner in which the furnace bottom block is demounted from a transfer car.

A description will now be given of the operation for replacing the furnace bottom block 21, with reference to FIG. 9.

A transfer car 30 is stationed beneath the furnace bottom block 21 and a lifting cylinder 31 is extended. Workers on a platform 32 then uncouples the flanges 15 so as to disconnect cables which lead to the furnace bottom electrode 8 and the gas injection tuyere 12, cooling pipes 10, 11 leading to the water cooling box 9 and the outer and inner tubes 13 and 14, and disconnect also cables for thermometer and so forth. At the same time, portable separation jacks 27 are set between the base plate 22 of the furnace bottom block 21 and the seats 20 provided on the bottom pate 5. Hydraulic lines leading to the separation jacks 27 are not shown.

After completion of the above-described preparatory work, bolts 25 are loosened and removed to disconnect the base plate 22 of the furnace bottom block 22 from the reinforcement flange 19 around the bottom opening in the bottom plate 5. Subsequently, the separation jacks 27 are actuated so that the upper ends of these jacks 27 are pressed against the seats 20 on the bottom plate 5, so that the refractory 6 of the furnace bottom block 21 with downwardly diverging tapered surface is separated from the refractory bricks on the surface, whereby the furnace bottom block 21 with the furnace bottom electrode 8 is extracted from the furnace bottom opening 17 and seated on the transfer car 30.

Then, the transfer car 30 is moved to a suitable place where any damaged portion of the refractory 6 is repaired and new furnace bottom electrodes 8 and gas injection tuyere 12 are embedded. The furnace bottom block 21 thus repaired is then brought to the position beneath the furnace by the transfer car 30. Then, the workers on the platform 32 operates the lifting cylinder 31 so that the furnace bottom block 21 on a support 33 is fitted in the furnace bottom opening 17. Then, the base plate 22 of the furnace bottom block 21 is fastened by means of bolts, 25 to the reinforcement flange 19 around the furnace bottom opening 17 in the bottom plate 5. Then, clearances between the refractory 6 of the furnace bottom block 21 and the refractory bricks 18 on the furnace body are filled with mortar, thus completing the renewal of the furnace bottom block 21.

As will be seen from the foregoing description, according to the present invention, it is possible to fully automatically control, from a remote control station, the operation for injecting oxygen through a tuyere provided on the bottom of a direct current electric furnace which melts scraps charged therein into steel melt and refines the steel melt.

In addition, the combination of the furnace bottom electrodes and gas injection tuyere as specified by the present invention promotes melting of the scraps and enhances the agitation so as to increase the efficiency of the refining reaction. As a consequence, the time required for the melting and refining can be shortened.

Furthermore, the invention allows an easy replacement of the furnace bottom block which includes the furnace bottom electrodes and tuyeres at a high efficiency with a comparatively simple apparatus. As a consequence, costs for installation and repair are reduced to attain a higher rate of operation of and a higher rate of operation of direct current electric furnace is attained.

What is claimed is:

1. A furnace bottom refractory structure of a direct current electric furnace, comprising a furnace bottom electrode and a gas injection tuyere provided in the furnace bottom refractory structure of said direct current electric furnace, wherein said furnace bottom electrode and said gas injection tuyere are embedded in a substantially cylindrical shaped refractory body having a downwardly diverging tapered upper portion, and said refractory body, said furnace bottom electrode and said gas injection tuyere, in cooperation, form an integral furnace bottom block which is detachably secured to the furnace bottom refractory structure so as to fit into and close a furnace bottom opening.

2. A furnace bottom refractory structure of a direct current electric furnace according to claim 1, wherein said furnace bottom electrode is a hollow cylindrical electrode charged with a refractory, and said gas injection tuyere is embedded substantially i the central portion of said furnace bottom electrode.

3. A furnace bottom refractory structure of a direct current electric furnace according to claim 1, wherein a water supply pipe for cooing said furnace bottom electrodes is connected by means of flanges and adjacent portions of the flanges consist of flexible electric conductors.

* * * * *